US007214010B2

(12) United States Patent
Hellbach et al.

(10) Patent No.: US 7,214,010 B2

(45) Date of Patent: May 8, 2007

(54) TOOL BIT HOLDER AND HAND POWER TOOL

(75) Inventors: Manfred Hellbach, Leinfelden-Echterdingen (DE); Gerhard Meixner, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/286,225

(22) Filed: Nov. 23, 2005

(65) Prior Publication Data

US 2006/0197293 A1 Sep. 7, 2006

(30) Foreign Application Priority Data

Mar. 7, 2005 (DE) ...................... 10 2005 010 265

(51) Int. Cl.
*B23B 31/107* (2006.01)
*B25D 17/08* (2006.01)

(52) U.S. Cl. ....................... 408/240; 279/19.6; 279/75; 279/82

(58) Field of Classification Search ...... 279/19.3–19.7, 279/22, 30, 75, 82, 904, 905; 408/240
See application file for complete search history.

(56) References Cited

U.S. PATENT DOCUMENTS 4,131,165 A * 12/1978 Wanner et al. ................ 173/48
4,502,824 A * 3/1985 Dohse et al. ............... 409/234
4,858,939 A * 8/1989 Riggs .......................... 279/75
5,016,892 A * 5/1991 Lafforgue et al. ............. 279/82
5,199,833 A * 4/1993 Fehrle et al. ........... 408/239 R
5,706,903 A * 1/1998 Odendahl et al. ........... 173/104
5,971,403 A * 10/1999 Yahagi et al. .............. 279/19.3
6,669,206 B2 * 12/2003 Hanke ....................... 279/19.4
2003/0006566 A1 1/2003 Below et al.

FOREIGN PATENT DOCUMENTS

DE 101 45 406 A1 8/2002
GB 2 360 240 9/2001
GB 2 401 817 11/2004
GB 2 405 114 2/2005
WO 2005/089989 9/2005

* cited by examiner

*Primary Examiner*—Daniel W. Howell
(74) *Attorney, Agent, or Firm*—Michael J. Striker

(57) ABSTRACT

A tool bit holder for a hand power tool has a tool bit holder body has a receiving bore for a tool bit shaft of a tool bit insert with at least one recess, a locking body snappable into place with the recess of the tool bit shaft and supported radially displaceably in the tool bit holder body; a slide sleeve supported resiliently in an axial direction and operatively connected to the locking body so that upon a motion of the slide sleeve counter to a spring force the locking body escapes out of the receiving bore, and a guide ring, wherein the locking body is caught in a first opening of the tool bit holder body and in a second opening at least partially covering the first opening, of the guide ring supported displaceably on the tool bit holder body.

11 Claims, 1 Drawing Sheet

TOOL BIT HOLDER AND HAND POWER TOOL

CROSS-REFERENCE

The Invention described and claimed hereinbelow is also described in DE 10 2005 010 265.4, filed Mar. 7, 2005. This German Patent Application, whose subject matter is incorporated here by reference, provides the basis for a claim of priority of invention under 35 U.S.C. 119 (a)–(d).

BACKGROUND OF THE INVENTION

The present invention relates to a tool bit holder and to a hand power tool.

For heavy drill hammer and/or chisel hammers, until now, for the sake of stability automatic locks of the kind known for lightweight drill hammers have not been used. In heavy drill hammer and/or chisel hammers, whichever tool bit insert is inserted into the tool bit holders has been locked and unlocked by hand, using a blocking device actuatable from outside the tool bit holder.

In German Patent Disclosure DE 101 05 406 A1, a tool bit holder with automatic locking has been proposed that is especially suitable for drill hammer and/or chisel hammers. The tool bit holder has a blocking bolt, located transversely to the longitudinal axis of a basic body of the tool bit holder, as its locking body, which is movably supported in a guide path, and in which the blocking bolt, for locking a tool bit shaft, can move toward the tool bit shaft and for releasing and removing the tool bit shaft can move away from the tool bit shaft. The guide path extends in the basic body and continues in a slide sleeve that surrounds the basic body. The blocking bolt locks the tool bit shaft by engaging a recess on the tool bit shaft. For the release, the slide sleeve and the basic body are aligned with one another such that the blocking bolt can escape out of the recess outward along the guide path.

SUMMARY OF THE INVENTION

It is therefore an object of the present invention to provide a tool bit holder and also a hand power tool, which eliminate the disadvantages of the prior art.

The invention is based on a tool bit holder for a hand power tool, in particular a drill hammer and/or chisel hammer, which is drivable in hammering and/or rotating fashion, having a tool bit holder body with a receiving bore for a tool bit shaft of a tool bit insert with at least one recess, in which at least one locking body capable of being snapped into place for the recess of the tool bit shaft is supported radially displaceably in the tool bit holder body and is operatively connected in such a way to a slide sleeve, supported resiliently in the axial direction, that upon a motion of the slide sleeve counter to a spring force, the locking body escapes out of the receiving bore.

It is proposed that the locking body is caught in a first opening of the tool bit holder body and in a second opening, at least partially covering the first opening, of a guide ring supported displaceably on the tool bit holder body.

As a result, an automatic tool bit holder for hammers with a splined shaft or hexagonal tool bit inserts of more than 15 mm in diameter, in particular, is created. The tool bit holder is economical, simple, and lightweight. The invention combines the simplicity of an automatic tool bit holder having a locking ball with the wear resistance of a blocking bolt tool bit holder. By setting the locking body in the guide ring, tilting of the locking body is reliably avoided. Sliding of the locking body in an oblique guide conduit in the tool bit holder body and in the slide sleeve can be avoided. The locking body can have a larger size than is the case with a locking bolt. The risk of canting is reduced.

Stable, automatic locking of the tool bit insert is successful if the locking body, in the locking position of the tool bit shaft, is compartmented by a locking ring in the first and second openings. Preferably, the locking ring is located in a groove in the slide sleeve. Favorably, the locking ring, on its outer faces oriented toward the locking body, has flanks that are adapted at least in their inclination to the locking body in its respective installed position, that is, upon insertion of the tool bit shaft of the tool bit insert into the receiving bore or upon removal of the tool bit insert.

If the locking body for locking the tool bit shaft is displaceable with the guide ring in the insertion direction of the tool bit shaft, then the tool bit insert can be inserted in a simple way, as in an automatic tool bit holder with a locking ball. Expediently, the guide ring is displaceable counter to a spring force of a locking spring. A suitable protrusion on the tool bit shaft can push the locking body with the guide ring in the insertion direction without the slide sleeve having to be actuated, until the locking body can escape outward into a hollow chamber that is provided.

For removal of the tool bit, the slide sleeve is preferably displaceable in the insertion direction of the tool bit shaft such that the locking body escapes into a hollow chamber uncovered by the locking ring as it is entrained with the slide sleeve. The tool bit can easily be removed without major effort.

Preferably, the locking body is a locking cylinder, extending transversely to the longitudinal axis of the tool bit holder body. This locking cylinder essentially has the form of an ellipsoid, so that its contours are very well rounded. As a result, as the guide ring and/or locking ring and/or slide sleeve moves, the locking body can easily slide into its intended position. This makes the power tool easier for the user to manipulate while he is changing tool bits. Advantageously, the locking body corresponds in its length perpendicular to the longitudinal axis approximately to the diameter of the receiving bore.

The invention is further based on a hand power tool, in particular a drill hammer and/or chisel hammer, having a tool bit holder, which is drivable in hammering and/or rotating fashion, having a tool bit holder body with a receiving bore for a tool bit shaft of a tool bit insert with at least one recess, in which at least one locking body capable of being snapped into place for the recess of the tool bit shaft is supported radially displaceably in the tool bit holder body and is operatively connected in such a way to a slide sleeve, supported resiliently in the axial direction, that upon a motion of the slide sleeve counter to a spring force, the locking body escapes out of the receiving bore.

It is proposed that the locking body is caught in a first opening of the tool bit holder body and in a second opening, at least partially covering the first opening, of a guide ring supported displaceably on the tool bit holder body.

Further embodiments, aspects, and advantages of the invention will become apparent, even independently of how they are summarized in claims and without limiting the generality, from an ensuing exemplary embodiment of the invention described in conjunction with drawings.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
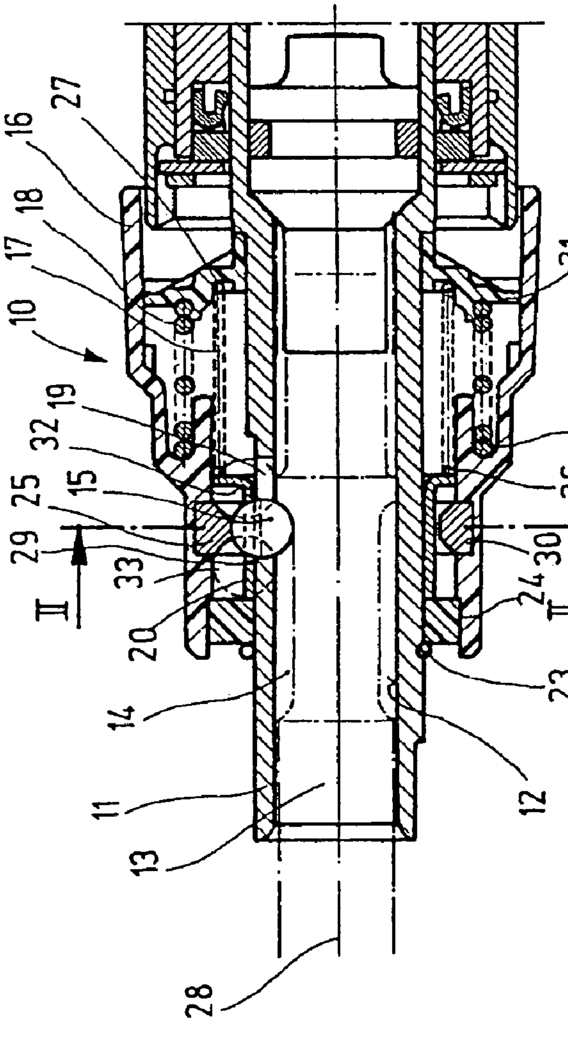
FIG. 1 is a longitudinal section through one region of a preferred hand power tool with a preferred tool bit holder.

FIG. 1 in longitudinal section shows a preferred tool bit holder for a hand power tool, in particular a heavy drill hammer and/or chisel hammer, which can be driven in hammering and/or rotating fashion. The tool bit holder 10 has a tool bit holder body 11 with a receiving bore 12 for a tool bit shaft 13 of a tool bit insert. At least one recess 14 is provided on the tool bit shaft 13 and can be engaged or snapped into by a locking body 15, which is radially displaceably supported in the tool bit holder body 11.

The locking body 15 is operatively connected in such a way that a slide sleeve 16, supporting resiliently in the axial direction by a spring 18, that upon a motion of the slide sleeve 16 counter to the spring force of the spring 18, the locking body 15 escapes out of the receiving bore 12 into a hollow chamber 33. The spring 18, embodied as a helical spring, is located between an indentation 22 in the slide sleeve 18 and an abutment 21 on an element that surrounds the tool bit holder body 11.

The locking body 15 is caught in a first opening 19 in the tool bit holder body 11 and in a second opening 29 of a guide ring 20, supported displaceably on the tool bit holder body 11, which second opening at least partly covers the first opening 19. The second opening 29 is embodied as smaller than the first opening 19 in the axial direction, relative to the longitudinal axis 28 of the tool bit holder body 11.

Figure 2:
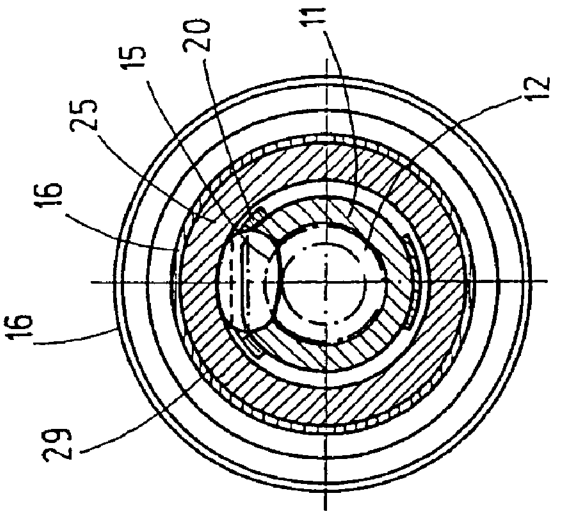
FIG. 2 is a section through the preferred tool bit holder taken along the line II—II in FIG. 1.

The locking body 15 is embodied as a locking cylinder, which extends transversely to the longitudinal axis 28 of the tool bit holder body 11 and is approximately in the form of an ellipsoid. In its length perpendicular to the longitudinal axis 28, the locking body 15 is approximately as long as the diameter of the receiving bore 12. The slide sleeve 16 can therefore be embodied as rotationally symmetrical on both the inside and the outside, since the locking body 15 does not engage the inside of the slide sleeve 16. The curvature of the locking body 15, embodied as a locking cylinder, conforms to the inner circumference of the locking ring 25 (FIG. 2).

Toward the end of the tool bit, the hand power tool is closed off with a closure element 24, which is axially fixed by a locking ring 23 on the tool bit holder body 11.

In the locking position of the tool bit shaft 13, the locking body 15 is compartmented by a locking ring 25 and the boundaries of the first and second openings 19, 29. The locking ring 25 is located in a groove 30 in the slide sleeve 16, so that upon an axial motion of the slide sleeve 16, the locking ring is entrained with it.

The locking ring 25, on its outer faces toward the locking body 15, has flanks 34, 35 that at least in their inclination are adapted to the locking body 15 in its applicable installed position, so that upon the corresponding actuation of the locking body 15, escaping out of the recess 19 or sliding back into the recess 14 is facilitated.

The locking body 15 can be used like a simple locking ball in a simple SDS tool bit holder. SDS originally stood for Steck-Dreh-Sitzt ["Insert-Turn-Sits"] or "Special Direct System", and is used particularly in hammers with a 10 mm shaft diameter for drilling and/or hammering tool bit inserts for lightweight hand power tools of up to 4 kg in weight. Upon automatic locking of the tool bit insert or its tool bit shaft 13, the locking body 15 is thrust with the guide ring 20 by a protrusion of the tool bit shaft 13 in the insertion direction, that is, to the rear, counter to the spring force of a locking spring 17.

The locking spring 17 is located between a collar 26 of the guide ring 20, which collar acts as an abutment and is folded over to the outside, and an indentation 27 in the same element that also forms the abutment 21 of the spring 18. The locking body 15 slides away beneath the locking ring 25 and is released because it can escape into a hollow chamber 32 in the insertion direction downstream of the locking ring 25. As a result, the tool bit shaft 13 can be introduced unhindered into the receiving bore 12. Once the tool bit shaft 13 has been fully inserted, the locking body 15 is thrust back forward by the locking spring 17, counter to the insertion direction, between the locking ring 25 and the recess 14 in the tool bit shaft 13 and in the process locks the tool bit insert.

For removal of the tool bit insert, the slide sleeve 16 is thrust by the user to the rear, in the insertion direction. The locking ring 25 is entrained in the process. As a result, the locking body 15 is released and can escape outward into the hollow chamber 33, which is located upstream of the locking ring in terms of the insertion direction, and the tool bit shaft 13 can easily move past with its protrusion, and the tool bit insert can be removed.

Figure 3:
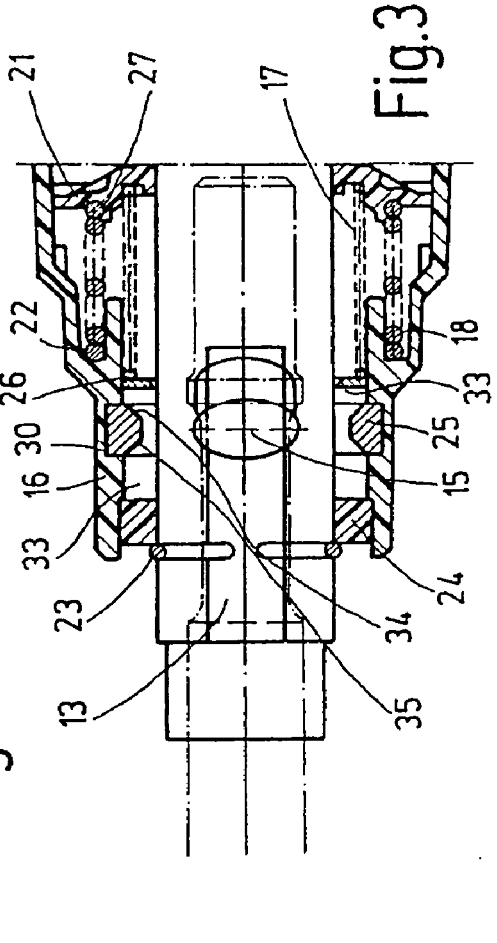
FIG. 3 is a top view on the preferred tool bit holder of FIG. 1.

FIG. 2, for illustrating the disposition of the preferred tool bit holder 10, shows a cross section taken along the line II—II in FIG. 1, while FIG. 3 shows a plan view from above. The advantageously small dimensions of the locking body 15, embodied as a locking cylinder, and its rounded, ellipsoid-like form are clearly visible. It is also clearly visible that the locking body 15 does not engage the inside of the slide sleeve 16, which can therefore be manufactured with less production effort than if a guide path had to be machined into it. Furthermore, the slide sleeve 16 can be relatively thin-walled, since it need not furnish a minimum wall thickness for a stable guide path.

It will be understood that each of the elements described above, or two or more together, may also find a useful application in other types of constructions differing from the types described above.

While the invention has been illustrated and described as embodied in, it is not intended to be limited to the details shown, since various modifications and structural changes may be made without departing in any way from the spirit of the present invention.

Without further analysis, the foregoing will so fully reveal the gist of reveal present invention that others can, by applying current knowledge, readily adapt it for various applications without omitting features that, from the standpoint of prior art, fairly constitute essential characteristics of the generic or specific aspects of the invention.

The invention claimed is:

1. A tool bit holder for a hand power tool, comprising a tool bit holder body having a receiving bore for a tool bit shaft of a tool bit insert with at least one recess; a locking body snappable into place with the recess of the tool bit shaft and supported radially displaceably in said tool bit holder body; a slide sleeve supported resiliently in an axial direction and operatively connected to said locking body so that upon a motion of said slide sleeve counter to a spring force, said locking body escapes out of said receiving bore; and a guide ring, said locking body being caught in a first opening of said tool bit holder body and in a second opening at least partially covering said first opening, of said guide ring supported axially displaceably on said tool bit holder body.

2. A tool bit holder as defined in claim 1; and further comprising a locking ring, said locking body in a locking position of said tool bit shaft is compartmented by said locking ring in said first and second openings.

3. A tool bit holder as defined in claim 2, wherein said slide sleeve has a groove, said locking ring engaging said groove in said slide sleeve.

4. A tool bit holder as defined in claim 3, wherein said locking ring has outer faces oriented toward said locking body and having flanks that are adapted at least in their inclination to said locking body in its respective installed position.

5. A tool bit holder as defined in claim 1, wherein said locking body for locking the tool bit shaft is displaceable with said guide ring in an insertion direction of the tool bit shaft.

6. A tool bit holder as defined in claim 5; and further comprising a locking spring providing a spring force, said guide ring being displaceable in the insertion direction of the tool bit shaft counter to the spring force of said locking spring.

7. A tool bit holder as defined in claim 1, wherein for removing the tool bit, said slide sleeve is displaceable in an insertion direction of the tool bit shaft, and said locking body escapes into a hollow chamber that is uncovered by said slide sleeve.

8. A tool bit holder as defined in claim 1, wherein said locking body is a locking cylinder extending transversely to a longitudinal axis of said tool bit holder body.

9. A tool bit holder as defined in claim 8, wherein said locking body has a length which is perpendicular to the longitudinal axis and corresponds approximately to a diameter of said receiving bore.

10. A tool bit holder as defined in claim 1, wherein the tool bit holder is configured for the hand power tool formed as a hammer selected from the group consisting of a drill hammer, a chisel hammer, and both, which is drivable in a fashion selected from the group consisting of hammering fashion, rotating fashion, and both.

11. A hand power tool formed as a hammer selected from the group consisting of a drill hammer, a chisel hammer, and both, comprising a tool bit insert having a tool bit shaft and at least one recess; and a tool bit holder which is drivable in a fashion selected from the group consisting of a hammering fashion, a rotating fashion, and both, said tool bit holder having a tool bit holder body having a receiving bore for a tool bit shaft of a tool bit insert with at least one recess, a locking body snappable into place of the recess of the tool bit shaft and supported radially displaceably in said tool bit holder body, a slide sleeve supported resiliently in an axial direction and operatively connected to said locking body so that upon a motion of said slide sleeve counter to a spring force, said locking body escapes out of the receiving bore, and a guide ring, said locking body being caught in a first opening of said tool bit holder body and in a second opening at least partially covering said first opening, of said guide ring supported axially displaceably on said tool bit holder body.

* * * * *